United States Patent [19]
Behr et al.

[11] Patent Number: 4,467,613
[45] Date of Patent: Aug. 28, 1984

[54] APPARATUS FOR AND METHOD OF AUTOMATICALLY ADJUSTING THE SUPERHEAT SETTING OF A THERMOSTATIC EXPANSION VALVE

[75] Inventors: Joseph L. Behr, Des Peres; David P. Hargraves, Webster Groves, both of Mo.

[73] Assignee: Emerson Electric Co., St. Louis, Mo.

[21] Appl. No.: 359,941

[22] Filed: Mar. 19, 1982

[51] Int. Cl.³ .......................... F25B 1/00; F25B 13/00
[52] U.S. Cl. ...................................... 62/115; 62/160; 62/202
[58] Field of Search ................ 62/225, 202, 192, 193, 62/212, 503, 115, 160

[56] References Cited

U.S. PATENT DOCUMENTS

| | | | |
|---|---|---|---|
| 2,296,680 | 9/1942 | McLenegan | 62/202 |
| 3,967,781 | 7/1976 | Kunz | 236/68 R |
| 4,067,203 | 1/1978 | Behr | 62/208 |

Primary Examiner—William E. Wayner
Attorney, Agent, or Firm—Polster, Polster and Lucchesi

[57] ABSTRACT

Apparatus for and a method of automatically adjusting the superheat setting of a thermostatic expansion valve of a refrigeration system is disclosed in which the superheat of the refrigeration system is maintained at a low superheat level so as to maximize the operating efficiency of the refrigeration system, and yet which prevents the return of excessive amounts of liquid refrigerant to the compressor which would be likely to cause damage to the compressor. This apparatus includes an electric heater for biasing the thermostatic sensing bulb of the thermostatic expansion valve and a control for the heater which is responsive to a refrigeration system parameter, such as the temperature of the lubricant in the compressor sump, so as to effect an increase in the temperature of the thermostatic bulb above the refrigerant temperature upon an indicated change in the parameter being monitored thereby to, in effect, reduce the superheat setting of the thermostatic expansion valve and to increase the flow of refrigerant through the refrigeration system. Upon sensing another indicated change in the parameter, the heater is de-energized (or at least the heater power is reduced) thereby to effect an increase in the superheat setting of the thermostatic expansion valve and to reduce the flow of refrigerant.

9 Claims, 12 Drawing Figures

APPARATUS FOR AND METHOD OF AUTOMATICALLY ADJUSTING THE SUPERHEAT SETTING OF A THERMOSTATIC EXPANSION VALVE

BACKGROUND OF THE INVENTION

This invention relates to apparatus for and a method of automatically biasing the superheat setting of a thermostatic expansion valve in a refrigeration system, an air conditioner, a heatpump, or other similar systems so as to maintain a low superheat setting for the thermostatic expansion valve and to maintain operation of the evaporator coil of the refrigeration system in a flooded or nearly flooded condition under a wide range of operating conditions, and yet so as prevent liquid refrigerant from entering the compressor.

Generally, a refrigeration system includes a compressor, a condenser coil, and an evaporator coil. Refrigerant vapor is compressed to a high pressure by the compressor and is conducted through the condenser coil where it is cooled to form a liquid under high pressure. This high pressure liquid is then adiabatically expanded through an expansion valve and is admitted into the evaporator coil where the refrigerant picks up heat from the surroundings of the evaporator coil. The heat absorbed by the evaporator coil transforms low pressure liquid in the evaporator coil into a vapor. The vapor is then conducted through the suction line of the refrigeration system and is returned to the inlet of the compressor.

Generally, it is not desireable that excessive liquid refrigerant be returned to the inlet of the compressor from the evaporator coil because this liquid refrigerant may dilute the lubricating oil in a typical hermetic compressor and thus cause damage to the compressor. Also, excessive quantities of liquid refrigerant in the compressor may damage certain of the compressor components, such as the compressor reed valves. On the other hand, in certain hermetic compressors, if not enough liquid refrigerant reaches the compressor, the windings for the motor for the compressor may not be sufficiently cooled thus also resulting in damage to the compressor.

The term "superheat" means raising the temperature of the refrigerant vapor above the temperature required to change the refrigerant from a liquid to a vapor at a specified pressure level. In many refrigeration systems, such as in domestic refrigerators, air conditioners and heatpumps, the evaporator coils are designed for complete evaporation of the refrigerant in the evaporator coil with only vapor being returned to the compressor via the suction line. This vapor is typically superheated in the last part of the coil so as to insure that the refrigerant flowing back to the compressor is always a vapor under all operating or load conditions. However, it is desireable that the majority of the length of the evaporator coil have liquid refrigerant therein (i.e., that it be wetted) because there is a much higher heat transfer coefficient between the coil and the liquid refrigerant than between the coil and the vapor refrigerant. Thus, a thermostatic expansion valve is typically used to regulate the flow of refrigerant through the evaporator coil so that under various operating conditions for the evaporator coil, the majority of the length of the coil will have liquid refrigerant therein, but yet the refrigerant flow is so limited as to insure that the evaporator coil does not become flooded and thus prevents the return liquid refrigerant (or excessive quantities thereof) to the suction side of the compressor. In other words, the thermostatic expansion valve automatically controls the flow of the refrigerant into the evaporator coil so as to maintain the superheat of the refrigerant leaving the evaporator coil at a predetermined level under various operating conditions.

In essence, a thermostatic expansion valve automatically maintains an ample supply of refrigerant to the evaporator coil without allowing liquid to pass into the suction line and the compressor. The operation of a thermostatic expansion valve typically depends on the superheated condition of the refrigerant leaving the evaporator coil. Generally, a short portion of the length of the evaporator coil is intended to have refrigerant vapor therein so that the temperature of the vapor exhausted from the evaporator is above the temperature corresponding to the evaporative pressure. This elevated refrigerant vapor temperature is referred to as the superheat and, for example, the flow of the refrigerant through the evaporator coil of a typical refrigeration system may be regulated by the thermostatic expansion valve to result in a superheat of about 5°–10° F.

In operation, with the thermostatic expansion valve set to a predetermined superheat operating setting, the thermostatic expansion valve will automatically adjust the quantity of refrigerant delivered to the evaporator coil so as to maintain a desired superheat condition of the refrigerant vapor exhausted from the evaporator coil. Upon the evaporator coil being exposed to a greater heat load, the heat absorbed by the refrigerant will increase thus increasing the superheat of the refrigerant exhausted from the evaporator coil. This in turn causes the temperature of the fluid in the thermostatic bulb controlling the thermostatic expansion valve to increase and to force the valve to a more open condition thereby allowing more refrigerant into the evaporator coil so as to reduce the superheat temperature. Conversely, if the load on the evaporator coil should be lowered, the superheat temperature of the vapor exhausted from the evaporator coil decreases and thus the temperature of the fluid in the thermostatic sensing bulb of the thermostatic expansion valve is lowered which in turn effects closing of the thermostatic expansion valve thereby to reduce the flow of refrigerant to the evaporating coil and also in turn increasing the temperature of the vapor exhausted from the evaporator coil. In all cases, however, the superheat level of the refrigerant exhausted from the evaporator coil is maintained near the preset superheat setting of the thermostatic expansion valve.

It is known that in a wetted evaporator coil, the temperature of the coil along its length decreases substantially linearly from the inlet to the outlet of the coil. However, at a point along the length of the coil where superheating of the refrigerant vapor begins, the temperature of the coil begins to rise rapidly, and this temperature rise continues to the coil outlet. This temperature inflection point is referred to as a notch. It will be appreciated that in a flooded coil (i.e., a coil which is wetted along its entire length), the temperature of the coil will uniformly decrease from its inlet to its outlet. However, in a starved coil in which the last portion of the coil is not wetted, the notch moves toward the inlet end of the coil and the superheated portion of the coil is not as efficient in removing heat from the surroundings as the wetted portion of the coil. Ideally, the superheat of the thermostatic expansion valve should be controlled so that the entire length of the coil is flooded or wetted under all operating conditions. However, control of the superheat and/or the amount of liquid refrigerant reaching the compressor of a heatpump or other refrigeration system is difficult to accurately control with known prior art thermostatic expansion valves.

Generally speaking, a heatpump is a refrigeration system having two refrigeration coils, one inside the building and one outside the building, either of which may be used as an evaporator coil or a condenser coil. In the cooling or air conditioning mode of the heatpump, the indoor coil is used as the evaporator and, while in the heating mode, the outdoor coil serves as the evaporator. A four-way selector valve is provided in the refrigerant lines between the coils so that the flow of refrigerant may be selectively directed to either of the coils for operation either as an evaporator or as a condenser coil. In the past, it has been difficult to select a fixed superheat setting for a conventional thermostatic expansion valve which provides satisfactory control of the superheat setting at all operating conditions and under both the heating and air conditioning mode. For example, such operating conditions as frost buildup on the coils, start up after a cold soak at low ambient temperatures, and defrost recovery have been difficult to accommodate with a fixed superheat setting in a thermostatic expansion valve. Also, system component failures (e.g., the failure of a evaporator or condenser fan motor) may impose even more severe demands on the thermostatic expansion valve to maintain an acceptable superheat setting so as to prevent damage to the compressor. With conventional thermostatic expansion valves, the superheat setting may only be changed by mechanically adjusting or varying the spring force exerted on the valve or by changing the fluid in the thermostatic sensing bulb so as to exert more or less pressure on the diaphragm at selected temperatures. However, it is not practical or desirable for the homeowner, for example, to make such adjustments to a heatpump or to an other refrigeration system in the home.

In an attempt to overcome the above-identified shortcomings of the prior art thermostatic expansion valves, electrically operable refrigerant expansion valves, such as shown in the co-assigned U.S. Pat. No. 3,967,781 to Kunz, have been employed in conjunction with a control system responsive to a parameter, such as the temperature of the lubricant in the sump of the compressor, or to ambient air temperature, so as to modulate the superheat setting of the electrically operable expansion valve. This control system is disclosed in the co-assigned U.S. Pat. No. 4,067,203 to Behr. The control system disclosed in the above-noted patent to Behr enabled the precise control of an electrically operable expansion valve so that the evaporator coil could be continuously operated in a flooded state (i.e., with liquid refrigerant in all parts of the coil) under varying load conditions, and yet prevented liquid refrigerant from entering the suction side of the compressor. It will be recognized that when the evaporator coil is maintained in its flooded or wetted state, optimum heat transfer (and thus optimum operating efficiency) for the refrigeration system results.

While the electrically modulated expansion valve, such as disclosed in Behr, U.S. Pat. No. 4,067,203, worked exceedingly well for its intended purpose, it did require the use of an electrically modulated expansion valve and the well-known thermostatic expansion valve could not be used. Thus, there has been a long standing need for a reliable and simple control system for altering the effective superheat setting of a conventional thermostatic expansion valve.

SUMMARY OF THE INVENTION

Among the several objects and features of the present invention may be noted the provision of a thermostatic expansion valve and a system and method of controlling the superheat setting of a thermostatic expansion valve in response to a parameter of the refrigeration system so as to maintain the evaporator coil of the refrigeration system in a flooded state with a very low superheat under a wide variation of operating conditions thereby to maximize the operating efficiency of the refrigeration system and yet insuring that no damage results to the refrigeration system or any component thereof because of excessive amounts of liquid refrigerant entering the compressor;

The provision of such a thermostatic expansion valve and a system or method which satisfactorily automatically and continuously varies the superheat setting of a conventional thermostatic expansion valve under a wide range of operating conditions, including such severe operating conditions as evaporator coil frost buildup, start up after a cold soak at low ambient temperatures, defrost recovery and during operation with a refrigerant component failure (e.g., the failure of an evaporator or condenser fan);

The provision of such a system or method which may be readily applied to a variety of conventional thermostatic expansion valves;

The provision of such a thermostatic expansion valve and a system or method which requires the monitoring of only a single refrigeration system parameter, such as the temperature of the lubricant in the compressor sump; and The provision of such a thermostatic expansion valve and a method or system which is of relatively simple construction and which is reliable in operation.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
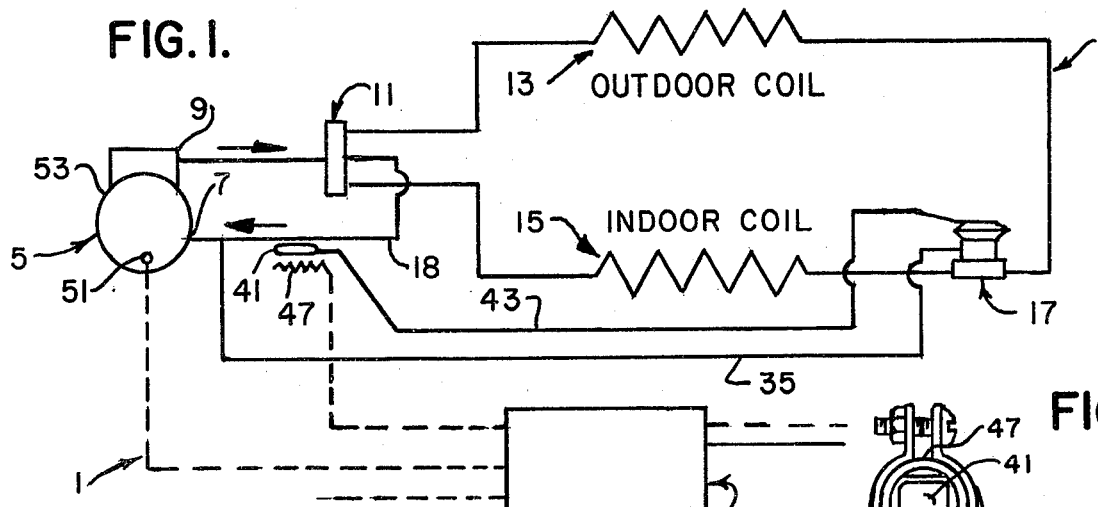
FIG. 1 is a schematic drawing of a conventional heatpump refrigeration system incorporating a control system of the present invention for automatically varying or biasing the superheat setting of a thermostatic expansion valve in predetermined response to a refrigeration system parameter, such as the temperature of the lubricant in the compressor of the refrigeration system.

Referring now to the drawings, apparatus of the present invention for automatically adjusting the superheat setting of a thermostatic expansion valve is indicated in its entirety by reference character 1. The control apparatus 1 of this invention is shown incorporated in a typical refrigeration system, as indicated generally at 3. Specifically, this refrigeration system 3 is shown to be a heatpump system including a hermetic refrigerant compressor 5 having an inlet 7 and an outlet 9. The compressor outlet is connected to a conventional four-way reversing valve 11. The heatpump refrigeration system 3 further includes a first coil, as indicated at 13, located outdoors and a second coil, as indicated at 15, located indoors. A conventional dual direction flow thermostatic expansion valve 17 is incorporated in the refrigeration lines between outdoor coil 13 and indoor coil 15. The center outlet of the four-way reversing valve 11 is connected to the inlet 7 of the compressor by means of a suction line 18.

In operation, compressor 5 delivers refrigerant at high pressure and high temperature to the inlet of four-way reversing valve 11. Assuming, for example, that heatpump system 3 is in its air conditioning mode, outdoor coil 13 functions as a condenser coil and indoor coil 15 functions an evaporator coil. However, upon selectively shifting reversing valve 11, heatpump system 3 operates in its heating mode so that outdoor 13 serves as the evaporator coil and indoor coil 15 serves as the condenser coil. It will be understood that, for simplicity, the operation of heatpump system 3 will be hereinafter discussed only in its cooling or air conditioning mode.

Figure 3:
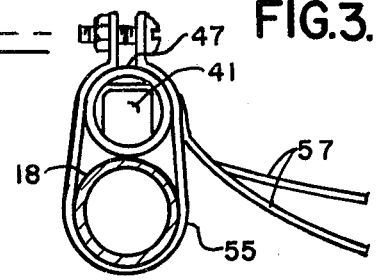
FIG. 3 is a vertical cross sectional view taken along line 3—3 of FIG. 2.
Figure 2:
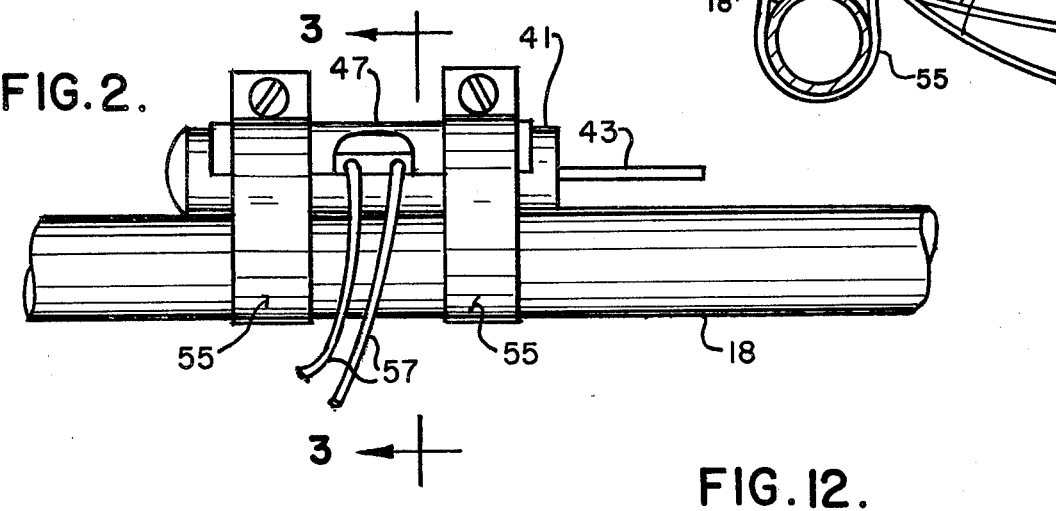
FIG. 2 is a side elevational view on an enlarged scale of a thermostatic expansion bulb in heat transfer relation with the suction line of the refrigeration system with a heater applied to the thermostatic bulb in accordance with the present invention.
Figure 4:
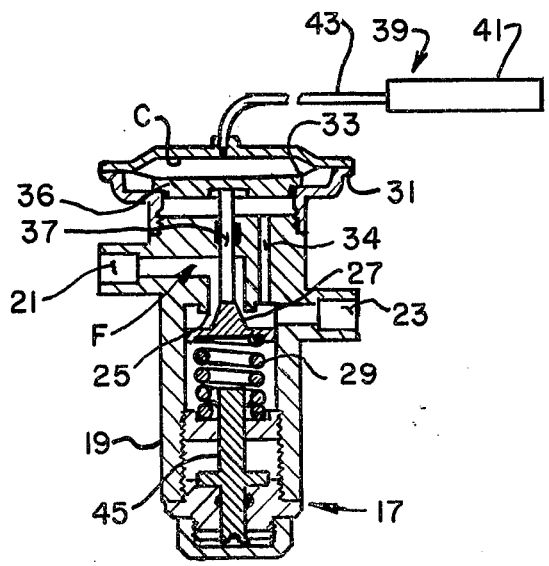
FIG. 4 is a vertical cross sectional view of a typical thermostatic expansion valve.

Referring now to FIG. 4, the construction of a typical prior art thermostatic expansion valve 17 will be described in detail. The thermostatic expansion valve includes a valve body 19 having a flow passage F therethrough including an inlet 21 and an outlet 23. An expansion port 25 is provided in flow path F and a valve member 27 is movable within valve housing 19 so as to selectively open or close expansion port 25 thereby to vary the amount of refrigerant flowing through flow path F. A compression coil spring 29 biases valve 27 toward its closed position. The thermostatic expansion valve further includes a thermostatic head 31 having a chamber C therewithin and flexible diaphragm 33 sealed within head 31 dividing chamber C into a first and a second portion. The second portion of the thermostatic head is in communication with the refrigerant flowing through flow path F down stream from expansion port 25 via a pressure equalizing port 34. As shown in FIG. 1, in place of pressure equalizing port 34, thermostatic expansion valve 17 may be provided with an evaporator pressure sensing line 35 for sensing the pressure of the refrigerant in suction line 18. Line 35 is in communication with chamber C and thus compensates for pressure differences of the refrigerant between the location of thermostatic expansion valve 17 and the location of thermostatic bulb 41. A load transfer plate 36 is provided within the thermostatic head. This plate is engagable with a stem 37 extending from and connected to valve 27. Further, a thermostatic sensor, as generally indicated at 39, is, in FIGS. 1-3, shown to be in heat transfer relation with suction line 18 so as to sense the temperature of the refrigerant exhausted from the outlet of the evaporator coil and returned to the suction inlet 7 of compressor 5.

Specifically, thermostatic sensor 39 is shown to be a temperature sensing bulb 41 charged with a quantity of volatile (or expansible) fluid, such as a refrigerant, and interconnected to thermostatic head 31 via a capillary tube 43. The manner in which bulb 41 is charged and the type of volatile fluid used to charge the bulb are well-known to those skilled in the refrigerant component manufacturing art and thus will not be described in detail herein. The fluid pressure of the temperature sensing fluid in bulb 41 acts on one face of diaphragm 33 while the pressure force of the refrigerant in flow path F downstream from expansion port 25 plus the force of spring 29 acting through valve 27 and valve stem 37 acts on the other face of the diaphragm. These forces counterbalance one another and thus maintain a desired flow rate of refrigerant through the expansion valve. For example, upon the heat load of the evaporator coil increasing so as to result in increased superheat of the refrigerant flowing therethrough, thermostatic sensing bulb 41 in heat transfer relation with the suction line returning the superheated refrigerant to the compressor will sense an increase in refrigerant temperature thus increasing the pressure force exerted on diaphragm 33 and thus overcoming, at least in part, the biasing force of spring 29 thereby to further open valve 27 and to permit increased flow of refrigerant to the evaporator coil. This increased flow of refrigerant, of course, acts to lower the superheat of the refrigerant and thus returns operation of the evaporator coil to its predetermined superheat level. Conversely, upon the heat load on the evaporator coil decreasing, the amount of superheat of the exiting refrigerant vapor will decrease thus cooling the thermostatic sensing bulb and effecting a decrease in pressure on the upper face of diaphragm 33 thereby permitting biasing spring 29 to at least partially close port 25 so as to decrease the flow of refrigerant to the evaporator coil. This, of course, returns the superheat of the coil to its predetermined superheat level. Stated otherwise, a thermostatic expansion valve by sensing both the temperature of the refrigerant (by bulb 41) and the pressure (by pressure line 35) of the refrigerant at a point along the suction line 18, for a particular superheat setting of the thermostatic expansion valve, makes a mechanical analog calculation and opens or closes valve 27 in proportion of the rise or drop in temperature or pressure of the refrigerant in the suction line relative to a set point (i.e., the superheat setting) of the thermostatic expansion valve.

The superheat setting of a conventional thermostatic expansion valve 17 may be adjusted by removing a screw cap from the bottom of the thermostatic expansion valve 17 and by adjusting a rotary stem 45 so as to increase or decrease the compression of spring 29 and thus vary the force tending to bias valve 27 toward its closed position. Alternatively, the superheat setting of the valve may be changed by varying the charge of volatile fluid in bulb 41. As mentioned, however, once the superheat setting of a conventional thermostatic expansion valve has been adjusted at the factory to a predetermined superheat setting, the superheat setting of the valve would not normally be adjusted, except during a service call by a qualified refrigeration repair person.

The refrigeration system 3 together with the thermostatic expansion valve 17 heretofore discussed in detail are substantially conventional and do not, per se, constitute the system or method of the present invention.

In accordance with the present invention, means 46 is provided so as to maintain a conventional thermostatic expansion valve 17 at a relatively low superheat setting and to maintain operation of the evaporator coil in a flooded or nearly flooded condition under a wide range of operating conditions, and yet so as to prevent excessive quantities of liquid refrigerant from entering compressor 5. This means comprises an electric resistance heater 47 applied to and in heat transfer relation with thermostatic sensing bulb 41 so as to selectively heat bulb 41 above the superheat temperature sensed by the bulb of the refrigerant flowing through suction line 18. Additionally, means 46 of the present invention includes a power supply and control system, as indicated generally at 49, for monitoring a parameter of refrigeration system 3 and for selectively supplying power to heater 47 in response to the system parameter being monitored thereby to vary the superheat setting of thermostatic expansion valve 17. While many refrigeration system parameters, such as ambient air temperature, actual suction line refrigerant temperature, the temperature difference between the inlet and outlet of the evaporator coil, and the temperature of the air discharged from the evaporator coil may serve as a system parameter which can be monitored by power supply and control system 49, a preferred system parameter for use with means 46 of the present invention is the temperature of the lubricant in the sump of compressor 5, as monitored by a temperature sensor 51. It will be understood, however, that any of the above parameters, or even other system parameters, may be used as a reference in accordance with the broader aspects of this invention.

As disclosed in the co-assigned U.S. Pat. No. 4,244,182 to Behr, conventional thermostatic expansion valves attempt to hold a constant superheat, but because of variations in outdoor ambient air temperatures, the temperature of the compressor 5 (which is typically located outdoors) and outdoor coil 13 cause the superheat to vary. Because the compressor is located outdoors, use of the sump temperature to bias the superheat setting of a thermostatic expansion valve in accordance with this invention automatically compensates for changes in ambient air temperature.

Typically, a hermetic compressor, such as illustrated at 5 in FIG. 1, includes a shell 53 which totally encloses and hermetically seals both the compressor and the electric motor driving the compressor. Lubricant for the motor and the compressor is enclosed within the shell 53 and is circulated over the moving parts of the compressor and motor in a manner well known to those skilled in the art. Generally, if the oil or lubricant sump temperature of the compressor is maintained between predetermined temperature limits, one can be assured that the compressor is not being flooded with excessive amounts of liquid refrigerant or that the compressor is not being over heated as a result too high of superheat on the refrigerant vapor being returned to the inlet 7 of the compressor via suction line 18. Liquid refrigerant being returned to the compressor has the immediate effect of lowering the lubricant sump temperature of the compressor below a predetermined limit. Operation of the control system of the present invention responsive to the lubricant sump temperature of compressor 5 will be described in detail hereinafter.

As best shown in FIGS. 2 and 3, heater 47 is an electrical resistance blanket heater applied to thermostatic bulb 41 and held in positive heat transfer relation with bulb 41 by means of clamps 55 and/or a suitable adhesive. These clamps serve the double function of both holding the bulb 41 in heat transfer relation with suction line 18 and also of holding heater blanket 47 in heat transfer relation with bulb 41. As best shown in FIG. 3, it is preferable that bulb 47 be applied on the upper surface of suction line 18 so that the thermostatic bulb in fact senses the temperature of superheated refrigerant vapor flowing through the suction line. As is well known to those skilled in the art, if the capillary sensing bulb 41 is applied to suction line 18 at the bottom thereof, the suction bulb would sense the temperature of any liquid refrigerant that may flow through the suction line. Because it is desireable to maintain good heat transfer relation between bulb 41 and the suction line, preferably, heater blanket 47 is applied to a portion of the bulb not in heat transfer relation with the suction line. Electrical power is supplied to heater blanket 47 by means of wires 57. For example, heater 47 may consist of flexible metal foil resistance heating elements laminated between thin sheets of suitable synthetic resin electrically insulated material, such as silicone rubber or the like.

Figure 5:
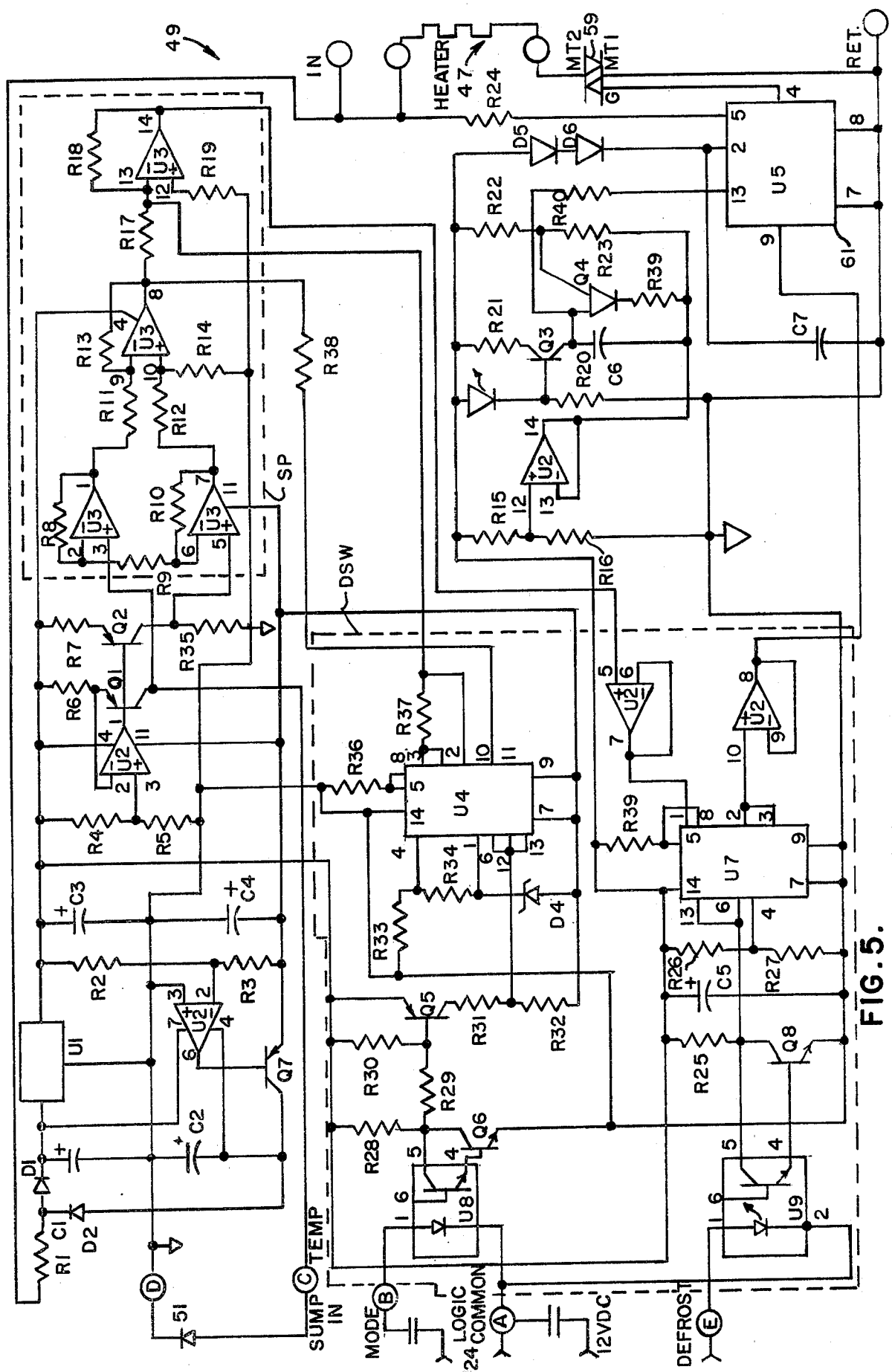
FIG. 5 is an electrical schematic for a control and power supply system for regulating energization of the heater shown in FIGS. 1-3.

Referring now to FIG. 5, an electrical schematic for power supply and control system 49 is illustrated in detail. Generally speaking, power supply and control system 49 receives input signals from the refrigeration system parameter being monitored (e.g., from lubricant sump temperature indicator 51) and from the mode of operation of the refrigeration system (i.e., whether the refrigeration system is being operated in its heating, cooling or defrost mode). Then, depending on the mode of operation and the temperature of the compressor sump temperature, electronic circuits in control system 49 regulate the power supplied to heater 47 so as to bias the temperature of thermostatic bulb 41 thereby to increase or decrease the superheat setting of thermostatic expansion valve 17. Specifically, the temperature of the lubricant in compressor sump is monitored by temperature sensor 51 which is preferably a PN junction diode operated in forward current mode. The voltage drop across this diode, at constant current, is a linear function of the junction temperature (i.e., the temperature of the lubricant in the sump of the compressor). This lubricant sump temperature signal is then processed by the electronic circuitry shown in FIG. 5 so as to supply power to heater 47 and to regulate the superheat setting of thermostatic expansion valve 17 as a function of the lubricant sump temperature.

Generally, control means 49 may be a package of various solid state circuits which control load current supplied to heater 47. These circuits may include, for example, silicon controlled rectifiers (SCRs), triacs, power transistors, and power rectifier diodes which can function as tranformers to increase or to step down voltage to a load, as pulse modulators so as to modulate the power waveform supplied to the heater, or as switches to provide a variable power level to the heater. Certain of the above circuits may function as rheostats or variable transformers which modulate the voltage amplitude of the waveform supplied to the heater. However, power waveform modulating circuits, such as SCR's, triacs and other thyristor-type switching circuits, electronically control the ratio of on time to total device operating time. Power modulating circuits generally have greater adaptability to a variety of control modes, are more compact, have a longer life and are more efficient than voltage amplitude modulators.

Control circuit 49, as shown in FIG. 5, comprises a trigger circuit which controls load (heater) current flowing through a thyristor switch, such as a triac 59. Circuit 49 utilizes phase control for controlling load current. In phase control, a continuously variable load current is obtained by controlling the period of thyristor switch (triac 59) supplying the heater. Circuit 49 utilizes triac 59 for full-wave operation. Specifically, the signal from temperature sensor 51 is fed into the input of analog signal processing circuitry SP and this output is fed to a mode and defrost switching network DSW which in turn supplies a signal to gate G of triac 59 through integrated circuit chip 61, which is a zero cross switch, so as to control the firing of the triac. By varying the output of the signal to the gate, it will be understood that the pulse width of the modulated voltage waveform supplied to heater 47 may be accurately controlled thereby to regulate the average heater wattage. Thus, the power output of control means 49 is a function of the pulse width passed through triac 59. In addition, signals relating to the mode of operation of refrigeration system 3 (i.e., whether the system is being operated in its heating, cooling or defrost mode) are also fed into chip 61 through switching network DSW and these signals, in addition to the signal from temperature sensor 51, modify the signal put out by the chip which regulates triac 59.

FIG. 5 depicts a preferred embodiment which is currently the best mode of constructing control means 49, and FIG. 5 utilizes conventional electronic symbols to schematically depict the circuitry. Table I, see Appendix, presents the values for the various components of control means 49. This circuit diagram together with Table I in the Appendix and the description of the operation of the circuit diagram herein provided would enable one skilled in the art to construct and use the control system 49 of the present invention. It will further be appreciated that the control circuit 49 illustrated in FIG. 5 is but one embodiment of a control circuit which may be utilized in accordance with the present invention. Those skilled in the art will be able to construct other control circuits which will function in accordance with the broader aspects of this invention as heretofore described.

Figure 8:
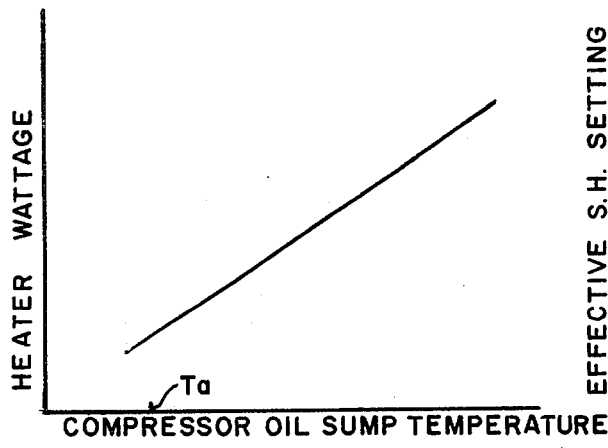
FIG. 8 is a graph representing the power supplied to the heater versus a refrigeration system parameter, such as the temperature of the lubricating oil in the sump of the compressor, wherein as the compressor oil sump temperature increases, the power supplied to the heater is correspondingly increased.

As heretofore explained, the compressor oil or lubricant sump temperature is monitored by temperature sensor 51 and is utilized as a parameter to control the superheat setting of thermostatic expansion valve 17. The output of heater 47, as controlled by control means 49, is preferably a linear function of the compressor oil sump temperature, as illustrated in FIG. 8. For example, as the temperature of the oil in the sump of compressor 5 increases above a predetermined temperature level, $T_a$, the signal output of temperature sensor 51 will trigger triac 59 to fire thereby initiating heating of heater 47 and thus heating or biasing temperature bulb 41. Initially, the width of the power waveform supplied to heater 47 via triac 59 is narrow and the heater wattage is correspondingly low. As the temperature of the sump lubricant increases, the width of the waveform supplied to heater 47 is increased. Conversely, as the temperature of the sump lubricant drops, the power supplied to the heater is decreased. Of course, as heretofore mentioned, control circuit 49 linearly increases the output of heater 47 in response to an increase in the compressor oil sump temperature, as heretofore described in regard to FIG. 8. As the heater wattage is increased and as the temperature of bulb 41 is thereby elevated above the temperature of suction line 18, the effective superheat setting of thermostatic expansion valve 17 is lowered. This, in turn, causes the thermostatic expansion valve 17 to increase the flow of refrigerant to the evaporator coil thereby resulting in a reduction of the superheat of the temperature of the refrigerant returned to the compressor.

Figure 9:
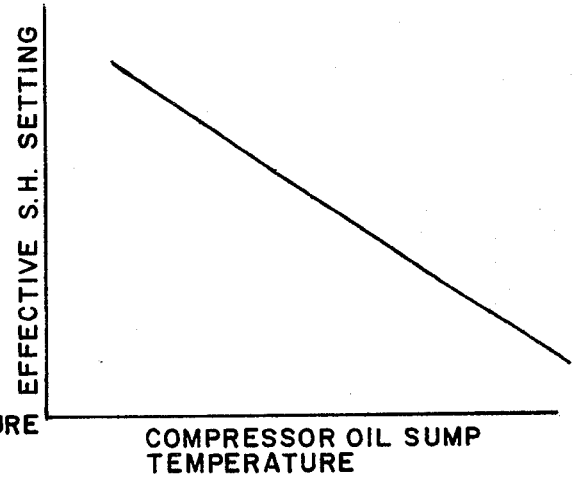
FIG. 9 is a graph illustrating the effective superheat setting of the thermostatic expansion valve, as changed or biased by the apparatus or the method of the present invention, versus compressor oil sump temperature illustrating that the effective superheat setting of the thermostatic expansion valve is decreased in response to an increase in compressor oil sump temperature.

Generally, the relationship between the effective superheat setting of the thermostatic expansion valve and the compressor oil sump temperature is a linear function, such as is illustrated in FIG. 9.

Because temperature sensor 51 monitors the temperature of the sump lubricant of compressor 5 and because this temperature is responsive to flooding or starving of evaporator 15 and/or the compressor, temperature sensor 51 constitutes means for sensing flooding or starving.

Figure 7:
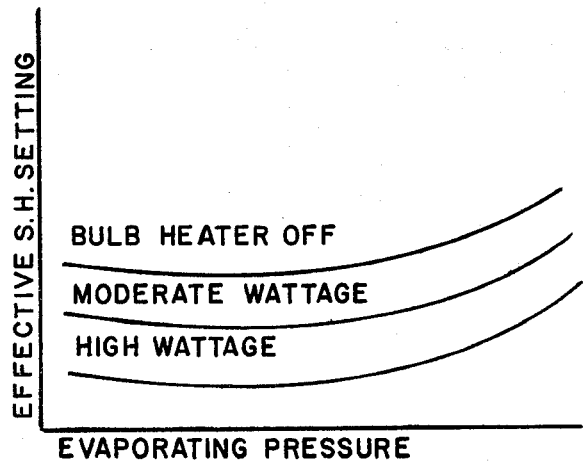
FIG. 7 is a graph illustrating three different superheat settings of a thermostatic expansion valve versus the evaporating pressure of the refrigerant in the suction line, the curves being substantially parallel to one another, but off-set relative to one another toward a lower superheat setting in response to the increased power supplied to the thermostatic bulb heater.

In FIG. 7, the superheat setting of thermostatic expansion valve 17 as a function of the evaporating pressure of the refrigerant in the suction line is shown. It will be noted that with heater 47 operated at various steady state wattages thereby to raise the temperature of bulb 41 a predetermined temperature above the temperature of suction line 18, the shape of the curve of superheat setting versus evaporating pressure remains substantially of the same shape, but is merely shifted to a higher or lower superheat setting, depending on the steady state output of the heater.

Figure 6:
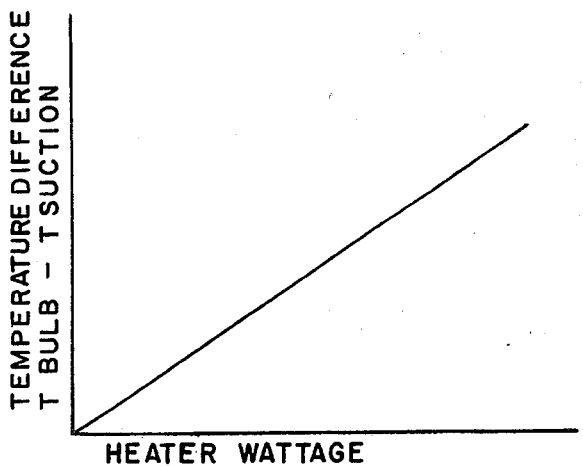
FIG. 6 is a graph illustrating that the relationship between the power applied to the heater in heat transfer relation with the thermostatic sensing bulb generates a substantially linear increase in the temperature difference between the temperature of the bulb and the temperature of the suction line as the power supplied to the heater is increased.

In operation, with temperature sensor 51 installed in the sump of compressor 5 so as to monitor the temperature of the lubricant in the compressor sump, an increase in the temperature of the oil in the sump of the compressor indicates that the refrigerant being returned to the compressor is at a higher superheat level. This increase in temperature of the sump oil of the compressor acting through control circuit 49 causes triac 59 to proportionally increase the average power supplied to heater 47 generally in accordance with the graph in FIG. 8. As the heater wattage increases in response to an increase in compressor oil sump temperature, the temperature difference between bulb 41 and suction line 18 is also increased (as shown in FIG. 6). Because the temperature of bulb 41 is increased by increased heater wattage, the fluid within bulb 41 acting on diaphragm 33 forces valve 27 of thermostatic expansion valve 17 to a more open position thereby increasing the flow of refrigerant through the thermostatic expansion valve 15 and thereby reducing the superheat of the refrigerant discharged from evaporator coil 15. This reduction in superheat temperature of the refrigerant thus acts as a reduction in the effective superheat setting of thermostatic expansion valve 17 and, as shown in FIG. 9, the result is that the effective superheat setting of the thermostatic expansion valve decreases upon an increase in compressor oil sump temperature.

Upon the load on evaporator 15 decreasing, the superheat of the refrigerant will decrease thus effecting a decrease in the temperature of lubricant in compressor 5. Temperature sensor 51 senses this decrease in superheat and provides less power to heater 47 via control means 49 and thus raises the effective superheat setting of thermostatic expansion valve 17.

Figure 12:
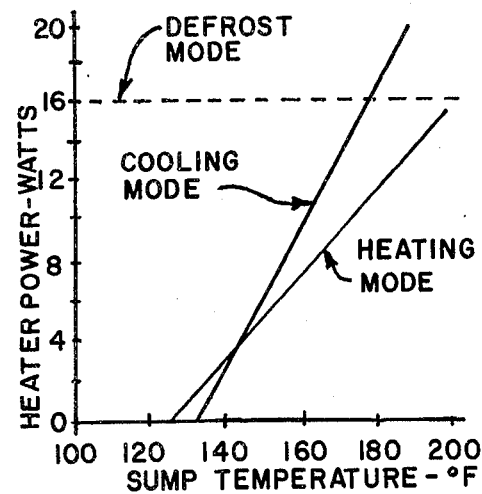
FIG. 12 (sheet 1) is a plot showing the relationship between the power applied to the heater during the heating, cooling, and defrost modes of the heatpump system illustrated in FIG. 1.

In addition to being responsive to the output of sump temperature sensor 51, control circuit 49 is also responsive to the selected operating mode of refrigeration system 3. As heretofore explained, refrigeration system 3 is shown to be a heatpump which may be selectively operated either in a heating or a cooling mode. Additionally, control circuit 49 is responsive to whether the refrigeration system is being operated in its defrost mode. FIG. 12 is a plot similar to FIG. 8 in that it shows heater wattage as a function of the compressor oil sump temperature in the heating and cooling modes of operation of the refrigeration system. As shown by the two curves in FIG. 12, it is desireable that the heater wattage be increased at a faster rate upon a given increase in compressor sump temperature when in the cooling mode than when in the heating mode. Thus, control circuit 49 is provided with inputs A and B which operate through appropriate circuitry feeding a signal into chip 61 thereby to vary the firing of triac 59 not only in response to compressor sump temperature, but also in response to whether the refrigeration system is being operated in its heating or cooling mode. Still further, control circuit 49 is provided with an input E for sensing when refrigeration system 3 is being operated in its defrost mode. When the refrigeration system is operated in its defrost mode, an input to chip 61 causes triac 59 to fire at such a rate so as to maintain a predetermined heater wattage regardless of sump oil temperature and thus, when in the defrost mode, the output of heater 47 is maintained at a steady state thereby to result in a preferred level of effective superheat of thermostatic expansion valve 17.

Figure 10:
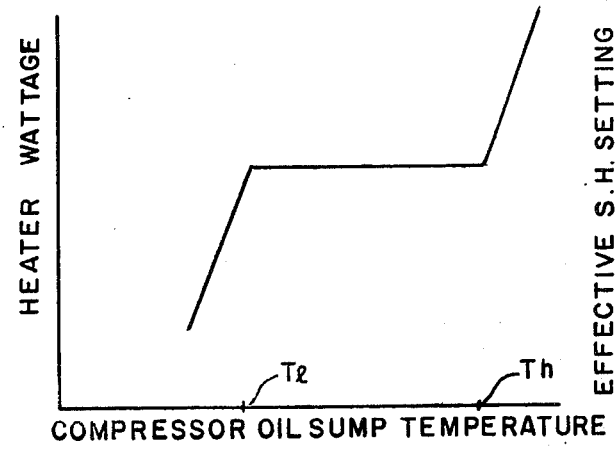
FIGS. 10 and 11 are two graphs indicating, respectively, the power supplied to the heater and the effective superheat setting of the thermostatic expansion valve, as a function of compressor oil sump temperature in which both the power supplied to the heater and the effective superheat setting of the thermostatic expansion valve remain constant over a predetermined temperature range of the compressor oil sump temperature.
Figure 11:
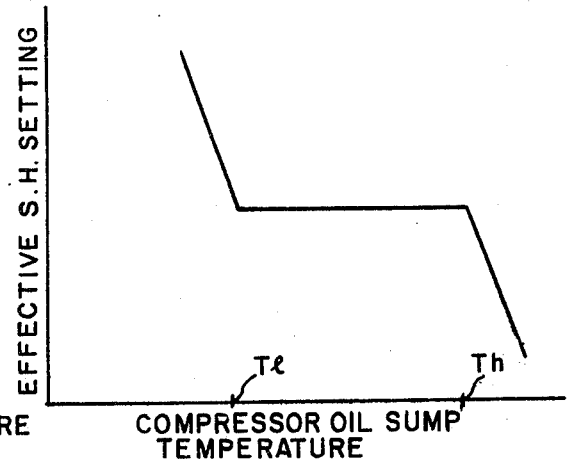

Referring to FIGS. 10 and 11, this invention may be operated in such a manner that as long as the compressor oil sump temperature remains within a predetermined temperature range, as indicated by $T_l$ and $T_h$ heater wattage will remain a constant value and likewise the effective superheat setting of thermostatic expansion valve 17 will also remain constant. However, upon the compressor oil temperature falling below this predetermined range (i.e., falling below temperature $T_l$), heater wattage will be decreased so as to result in an effective increase in the effective superheat setting of the thermostatic expansion valve. Likewise, upon an increase in the compressor oil sump temperature above this predetermined temperature range (i.e., above temperature $T_h$), the heater wattage will be increased so as to result in a decrease in the effective superheat setting of the thermostatic expansion valve, as shown in FIG. 11.

If such upper and lower temperature limits are used, a much simplified control and power system may be used in place of system 49 heretofore described. For example, a simple step control system having a first switch responsive to the sump temperature exceeding temperature $T_h$ and a second switch responsive to the sump temperature decreasing below a lower temperature $T_l$ with these switches being in series with preselected resistors and with heater 47 could be utilized to change the effective superheat setting of thermostatic expansion valve 17 only when the predetermined temperature limits $T_l$ and $T_h$ were exceeded.

It is believed that the method of the present invention is amply set forth in the above description of the construction and operation of the system of this invention. Thus, a detailed description of the method steps of this invention would be essentially repetitive and thus are omitted for the sake of brevity.

APPENDIX

Table of Components of Control Circuit 49

Resistors

| Resist. No. | Resist. - Ohms | Resist. No. | Resist. - Ohms |
|---|---|---|---|
| R1 | 100 | R20 | 33K |
| R2 | 3.48K | R21 | 240K |
| R3 | 3.48K | R22 | 100K |
| R4 | 2.21K | R23 | 62K |
| R5 | 8.25K | R24 | 3.6K |
| R6 | 1.96K | R25 | 100K |
| R7 | 1.96K | R26 | 61.9K |
| R8 | 100K | R27 | 49.9K |
| R9 | 47K | R28 | 100K |
| R10 | 100K | R29 | 4.7K |
| R11 | 4.3K | R30 | 13K |
| R12 | 4.3K | R31 | 11K |
| R13 | 36K | R32 | 11K |
| R14 | 36K | R33 | 3.83K |
| R15 | 10K | R34 | 750 |
| R16 | 3.83K | R35 | 510 |
| R17 | 56K | R36 | 10K |
| R18 | 51K | R37 | 31.6K |
| R19 | 20K | R38 | 75K |

Capacitors

| Cap. No. | Capacitance - uf |
|---|---|
| C1 | 330 |
| C2 | 330 |
| C3 | .47 |
| C4 | .47 |
| C5 | 1 |
| C6 | 1 |
| C7 | 10 |

Transistors

| Transistor No. | Model No. | Manufacturer |
|---|---|---|
| Q1 | 2N3906 | National Semiconductor or RCA |
| Q2 | 2N3906 | National Semiconductor or RCA |
| Q3 | 2N3906 | National Semiconductor or RCA |
| Q4 | 2N6028 | National Semicon- |

APPENDIX-continued
Table of Components of Control Circuit 49

| | | |
|---|---|---|
| Q5 | 2N3906 | ductor or RCA<br>National Semiconductor or RCA |
| Q6 | 2N3904 | National Semiconductor or RCA |
| Q7 | 2N3906 | National Semiconductor or RCA |
| Q8 | 2N3904 | National Semiconductor or RCA |

Diodes

| Diode No. | Model No. | Manufacturer |
|---|---|---|
| D1 | IN 4001 | National Semiconductor or RCA |
| D2 | IN 4001 | National Semiconductor or RCA |
| D4 | IN 5231A | National Semiconductor or RCA |
| D5 | IN 4001 | National Semiconductor or RCA |
| D6 | IN 4001 | National Semiconductor or RCA |

Integrated Circuits

| I.C. No. | Model No. | Manufacturer |
|---|---|---|
| U1 | IN78M120 | National Semiconductor or RCA |
| U2 | LM 324 | National Semiconductor or RCA |
| U3 | LM 324 | National Semiconductor or RCA |
| U4 | CD 4066 | National Semiconductor or RCA |
| U5 | CA 3079N | National Semiconductor or RCA |
| U6 | LM 741 | National Semiconductor or RCA |
| U7 | CD 4066 | National Semiconductor or RCA |
| U8 | OP 2150 | National Semiconductor or RCA |
| U9 | OP 2150 | National Semiconductor or RCA |

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawings shall be interpreted as illustrative and not in a limiting sense.

We claim:

1. In a heat pump system comprising a compressor having an inlet and an outlet, a first coil located out of doors, a second coil located indoors, said indoor and outdoor coils being in communication with one another, a shiftable valve connected to the outlet and the inlet of the compressor and to the outdoor and indoor coils, said valve being selectively shiftable between a first position in which refrigerant is delivered from the outlet of the compressor to the outdoor coil such that the heat pump system is operated in a cooling mode and a second position in which refrigerant is delivered from the outlet of said compressor to said indoor coil such that said heat pump system is operated in a heating mode, and a thermostatic expansion valve between said indoor and said outdoor coils, said thermostatic expansion valve having a thermostatic sensor in heat transfer relation with the refrigerant discharged from one of said coils for automatically varying the flow of refrigerant through said thermostatic expansion valve so as to maintain the refrigerant entering said compressor at a predetermined superheat level, said thermostatic expansion valve being pre-set at a predetermined superheat setting, wherein the improvement comprises: an electric heater in heat transfer relation with said thermostatic sensor, and control means responsive to an operating parameter of said heat pump system operating parameter for varying the heat output of said heater thereby to vary said superheat setting of said thermostatic expansion valve, said control means including means responsive to said heat pump system operating parameter when the heat pump system is in its heating mode for operating said heater along a first heater power output versus said operating parameter value function and being further responsive to said heat pump refrigeration system operating parameter when the heat pump system is in its cooling mode for operating said heater along a second heater power output function versus said operating parameter value function.

2. In a refrigeration system as set forth in claim 1 wherein said compressor has lubricant therein, and wherein said control means includes means for monitoring the temperature of the lubricant in said compressor, this lubricant temperature constituting said parameter.

3. In a refrigeration system as set forth in claim 1 wherein said control means includes a thyristor switch for supplying power to said heater, said thyristor switch having a gate and being operable to pass a pulse width modulated current therethrough to said heater upon a signal being applied to said gate, said control means supplying said signal in response to said parameter in such manner that the width of said current pulse passed by said thyristor switch to said heater is responsive to said system parameter.

4. In a refrigeration system as set forth in claim 3 wherein said compressor has lubricant therein, and wherein said parameter is the temperature of said lubricant in said compressor, said power supplied to said heater being increased by said control means in response to an increase in said lubricant temperature thus lowering the effective superheat setting of said thermostatic expansion valve.

5. In a heat pump system as set forth in claim 1 wherein the heater power supplied to said heater by said control means is proportionately increased at a faster rate upon increases in said parameter when said heat pump system is in its cooling mode than when said heat pump system is in its heating mode.

6. In a heat pump system as set forth in claim 1 wherein said heat pump system is further operable in a defrost mode, said heater being supplied a substantially constant amount of power at a predetermined power level when said heat pump system is operated in its defrost mode.

7. A method of automatically controlling the superheat setting of a thermostatic expansion valve in a heat pump system, said heat pump system comprising a compressor having an inlet and an outlet, a first coil located out of doors, a second coil located indoors, said indoor and outdoor coils being in communication with one another, a shiftable valve connected to the outlet and the inlet of the compressor and to the outdoor and indoor coils, said valve being selectively shiftable between a first position in which refrigerant is delivered from the outlet of the compressor to the outdoor coil such that the heat pump system is operated in a cooling mode and a second position in which refrigerant is delivered from the outlet of said compressor to said indoor coil such that said heat pump system is operated in a heating mode, and a thermostatic expansion valve between said indoor and said outdoor coils, said thermostatic expansion valve regulating the flow of refrigerant into one of said coils and having a thermostatic sensor in heat transfer relation with the refrigerant discharged from said one coil and returning to said compressor, said thermostatic sensor effecting a change in said thermostatic expansion valve so as to vary the flow of refrigerant therethrough whereby the temperature of said refrigerant entering said compressor is at a temperature above the evaporation temperature of the refrigerant, this last-mentioned temperature being referred to as superheat, said thermostatic expansion valve being preset at a predetermined superheat setting, said method comprising the steps of:

monitoring a parameter of said heat pump system responsive to the superheat of the refrigerant being returned to said compressor; and heating said thermostatic sensor in response to variations of said heat pump system parameter being monitored along a first relationship of heater output versus parameter value when said heat pump system is in its heating mode and along a second relationship of heater output versus parameter value when said heat pump system is in its cooling mode thereby to vary the effective superheat setting of said thermostatic expansion valve and to permit said heat pump system to be operated at a predetermined relatively low superheat level thus maximizing the operating efficiency of said heat pump system and yet insuring that no damage results to the refrigeration system due to liquid refrigerant being returned to said compressor regardless of whether the heat pump system is operated in its heating or cooling mode.

8. The method as set forth in claim 7 wherein the step of monitoring a refrigeration system parameter involves monitoring the temperature of the lubricant in the sump of said compressor.

9. The method of claim 7 wherein said parameter is a temperature of said refrigeration system, and wherein said step of heating said thermostatic sensor involves increasing the temperature of said thermostatic sensor in response to an increase in said refrigeration system temperature being monitored thereby to decrease the superheat setting of said thermostatic expansion valve and to increase the flow of refrigerant through said evaporator.

* * * * *